US009065637B2

(12) United States Patent
Spector et al.

(10) Patent No.: US 9,065,637 B2
(45) Date of Patent: Jun. 23, 2015

(54) SYSTEM AND METHOD FOR SECURING PRIVATE KEYS ISSUED FROM DISTRIBUTED PRIVATE KEY GENERATOR (D-PKG) NODES

(71) Applicant: CertiVox, Ltd., London (GB)

(72) Inventors: Brian P. Spector, Seattle, WA (US); Michael Scott, Dublin (IE); Gene Meyers, London (GB)

(73) Assignee: CERTIVOX LTD., London (GB)

( * ) Notice: Subject to any disclaimer, the term of this patent is extended or adjusted under 35 U.S.C. 154(b) by 331 days.

(21) Appl. No.: 13/749,398

(22) Filed: Jan. 24, 2013

(65) Prior Publication Data

US 2013/0191632 A1   Jul. 25, 2013

Related U.S. Application Data

(60) Provisional application No. 61/590,697, filed on Jan. 25, 2012.

(51) Int. Cl.
*H04L 9/08* (2006.01)
*H04L 9/30* (2006.01)

(52) U.S. Cl.
CPC .............. *H04L 9/083* (2013.01); *H04L 9/3073* (2013.01); *H04L 9/0847* (2013.01); *H04L 9/085* (2013.01)

(58) Field of Classification Search
CPC ..... H04L 9/0847; H04L 9/3073; H04L 9/083; H04L 9/085
See application file for complete search history.

(56) References Cited

U.S. PATENT DOCUMENTS

| | | | |
|---|---|---|---|
| 6,182,214 B1 | 1/2001 | Hardjono | |
| 7,590,236 B1 | 9/2009 | Boneh et al. | |
| 2005/0084100 A1 | 4/2005 | Spies et al. | |
| 2005/0125684 A1 | 6/2005 | Schmidt | |
| 2006/0023887 A1* | 2/2006 | Agrawal et al. | 380/277 |
| 2009/0024852 A1* | 1/2009 | Yonezawa et al. | 713/180 |
| 2009/0034742 A1 | 2/2009 | Appenzeller et al. | |
| 2010/0208895 A1* | 8/2010 | Boneh et al. | 380/278 |
| 2010/0325436 A1* | 12/2010 | Huang et al. | 713/171 |
| 2011/0222691 A1 | 9/2011 | Yamaguchi et al. | |

OTHER PUBLICATIONS

Distributed Private-Key Generators for Identity-Based Cryptography; Aniket Kate et al; Security and Cryptography for Networks; Lecture Notes in Computer Science vol. 6280, 2010, pp. 436-453.*
Asynchronous Distributed Private-Key Generators for Identity-Based Cryptography; Aniket Kate et al; Jun. 29, 2010.*
Distributed PKG ID Based Signcryption; Anoop Kumar Pandey et al.; Proceeding of the 2011 IEEE Students' Technology Symposium; Jan. 14-16, 2011, IIT Kharagpur.*
Sakai-Kasahara Key Encryption (SAKKE); M. Groves; RFC: 6508; Feb. 2012.*

(Continued)

*Primary Examiner* — Bradley Holder
*Assistant Examiner* — James Turchen
(74) *Attorney, Agent, or Firm* — Saul Ewing LLP

(57) ABSTRACT

A system and method where the "dealer" of a split Master Secret becomes the Master Key Server, whose role is to initially compute the Master Secret, create and distribute shares of the Master Secret to two Distributed Private Key Generators (D-PKG), initialize and route the inter-process communication between the nodes, co-ordinate and computationally participate in the User System's IBE Private Key generation process.

7 Claims, 8 Drawing Sheets

(56) References Cited

OTHER PUBLICATIONS

Distributing a Private Key Generator in Ad hoc Networks; Eystein Stenberg; May 2009; Faculty of Science—University of Tromso.*

Distributed Node Selection for Threshold Key Management with Intrusion Detection in Mobile Ad Hoc Networks; F. Richard Yu et al.; 2009 International Conference on Computational Science and Engineering; IEEE; 2009.*

International Searching Authority, International Search Report and Written Opinion for PCT International Patent Application No. PCT/US2013/023255, Mar. 29, 2013, 6 pages.

* cited by examiner

Figure 6

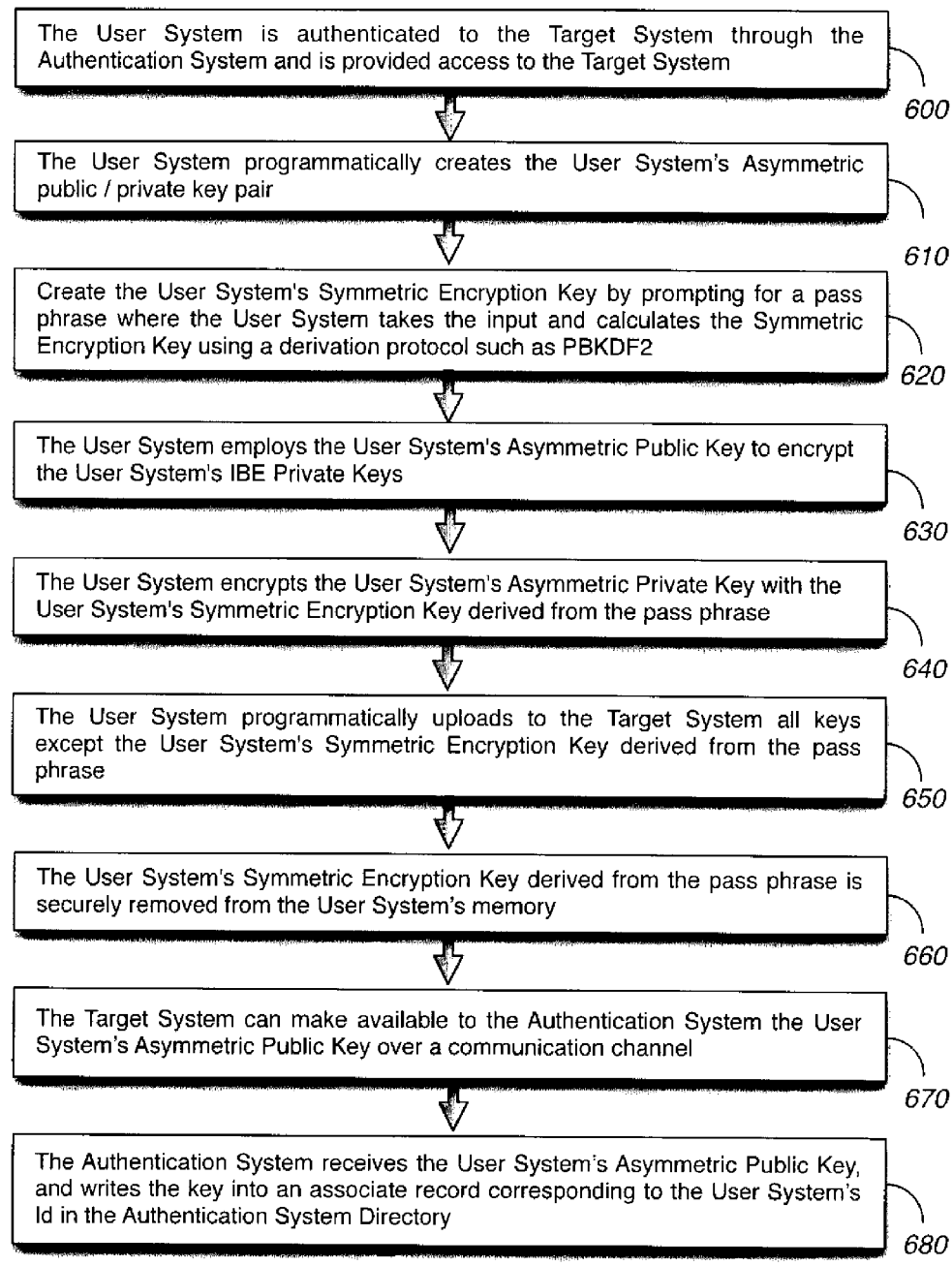

The User System is authenticated to the Target System through the Authentication System and is provided access to the Target System — 600

The User System programmatically creates the User System's Asymmetric public / private key pair — 610

Create the User System's Symmetric Encryption Key by prompting for a pass phrase where the User System takes the input and calculates the Symmetric Encryption Key using a derivation protocol such as PBKDF2 — 620

The User System employs the User System's Asymmetric Public Key to encrypt the User System's IBE Private Keys — 630

The User System encrypts the User System's Asymmetric Private Key with the User System's Symmetric Encryption Key derived from the pass phrase — 640

The User System programmatically uploads to the Target System all keys except the User System's Symmetric Encryption Key derived from the pass phrase — 650

The User System's Symmetric Encryption Key derived from the pass phrase is securely removed from the User System's memory — 660

The Target System can make available to the Authentication System the User System's Asymmetric Public Key over a communication channel — 670

The Authentication System receives the User System's Asymmetric Public Key, and writes the key into an associate record corresponding to the User System's Id in the Authentication System Directory — 680

_US 9,065,637 B2_

SYSTEM AND METHOD FOR SECURING PRIVATE KEYS ISSUED FROM DISTRIBUTED PRIVATE KEY GENERATOR (D-PKG) NODES

CLAIM OF PRIORITY

This application claims the benefit of priority to U.S. Provisional Patent Application No. 61/590,697, titled "SYSTEM AND METHOD FOR SECURING PRIVATE KEYS ISSUED FROM DISTRIBUTED PRIVATE KEY GENERATOR (D-PKG) NODES", filed Jan. 25, 2012; which application is herein incorporated by reference.

BACKGROUND

The present invention is in the field of encryption. The purpose of the invention is to secure private keys issued by an identity based encryption distributed private key generator process against compromise from other software processes in the same system, human operators of the system, or malicious software agents.

SUMMARY

In an identity-based encryption system (IBE), a client chooses an arbitrary string such as her e-mail address to be her public key. Consequently, with a standardized public-key string format, an IBE scheme completely eliminates the need for public-key certificates. As an example, in an IBE scheme, a sender can encrypt a message for a receiver knowing just the identity of the receiver and importantly, without obtaining and verifying the receiver's public-key certificate. Naturally, in such a system, a client herself is not capable of generating a private key for her identity. There is a trusted party called a private-key generator (PKG), which performs the system set-up, generates a secret called the Master Secret and provides private keys to users of the system (a User System's IBE Private Key). As the PKG computes a private key for a User System, it can decrypt all of her messages passively, a property called key escrow. This inherent key escrow property asks for complete trust in the PKG to not intercept and decrypt sensitive data, which is difficult to find in many realistic enterprise production scenarios.

BRIEF DESCRIPTION OF DRAWINGS

FIG. 6 is a block diagram that illustrates the steps taken to by the User System to archive the User System's IBE Private Keys with the Target System according to an embodiment of the invention.

DETAILED DESCRIPTION OF THE PREFERRED EMBODIMENT

Figure 1:
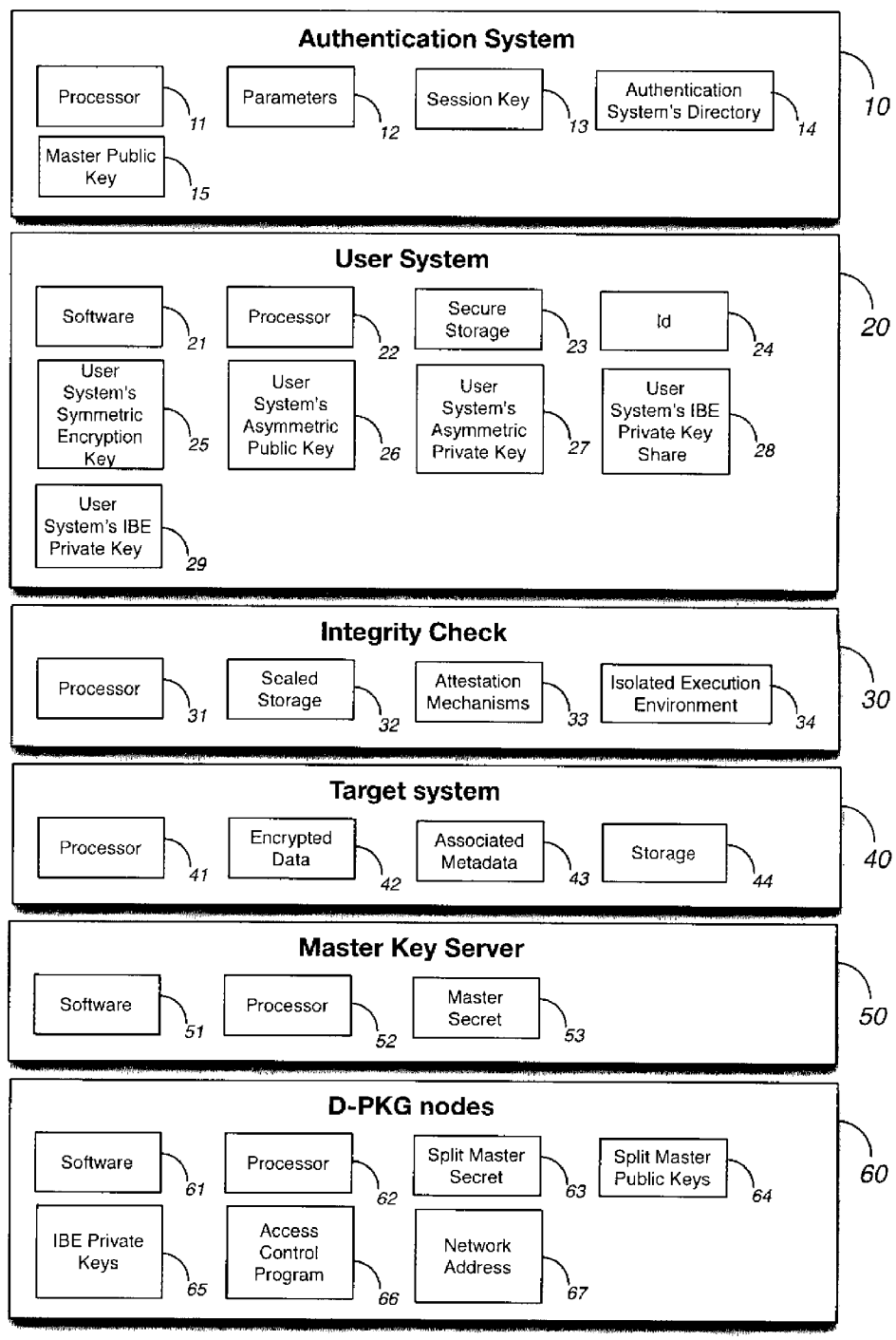
FIG. 1 is a block diagram illustrating the internal components and the external components interacting with the entire identity based encryption system in the preferred embodiment of the invention.

Therefore, finding a solution to safeguarding against abuses of the key escrow issue is an important and useful application in the field of identity based encryption. One way to mitigate the risks inherent in an identity-based encryption system is to distribute the PKG into Distributed Private Key Generator (D-PKG) nodes. In an (n, t)-distributed D-PKG, the Master Secret is distributed among n D-PKG nodes such that a set of nodes of size t or smaller cannot compute the Master Secret, while a client extracts her IBE Private Key by obtaining private-key shares from any t+1 or more nodes; she can then use the system's public key to verify the correctness of her thus-extracted key.

Currently, there are three main types of identity based private keys in use, all of which are based on pairings on elliptic curves, namely full-domain hash, commutative blinding and exponent inversion. Exponent inversion types provide the most efficient, in the random oracle model, identity based encryption (IBE) schemes known. Unfortunately, there is an inherent weakness in using exponent inversion type D-PKG nodes when compared to the other types; they require at least three nodes to be in operation, where other types require only two, and do not require as complex key extraction multi-computation protocols when run in a distributed setting.

The more complex the protocol, and the more nodes that must be available online to be run in a distributed setting, the higher the risk of a compromise of the nodes, which leads to compromise of the Master Secret used in generating private keys for the entire User System population, a catastrophic scenario. Therefore, reducing the amount of nodes needed to distribute the shares of the IBE private key, reducing the complexity of the communication protocol between the nodes, and employing cryptographic techniques such that the nodes or Master Key Server never need to escrow the Master Secret is highly desirable in an exponent inversion type identity based encryption system.

While much prior art exists for Distributed Private-Key Generators (D-PKG) of the full-domain hash type; the invention described contains a system and method that is the first method suitable an enterprise class production system using the exponent inversion type.

An object of the invention is to provide a system and method for securing exponent inversion type identity based encryption private keys issued from Distributed Private Key Generator (D-PKG) nodes that, 1) Addresses a security weakness of Distributed Private Key Generators in the exponent inversion type, namely, that at least three nodes are required to directly distribute shares of an identity based encryption private key, and that the nodes communicate via a complex communications protocol. The system and method reduces the required minimum of three nodes used in the computation and distribution of a User System's IBE Private Key and Master Public Key in the overall protocol; in effect, one node can go "offline" halfway through the protocol during which the three nodes serve shares of a private key to an authorized User System so that only two are necessary to distribute the User System's IBE Private Key and Master Public Key.

Using three nodes versus two is less than ideal in an enterprise production setting from a security standpoint. If two of the nodes collude (because they may have been compromised), they can recover the Master Secret and compromise the entire system, but one, acting alone, cannot. Reducing the amount of nodes that are publicly available in an enterprise production system lowers the risk of Master Secret exposure; hence, the ability of one of the nodes to go "off-line" halfway through the Master Public Key and User System's IBE Private Key generation and distribution protocol is highly desirable.

The invention describes a system and method where the "dealer" of the split Master Secret becomes the Master Key Server, whose role is to initially compute the Master Secret, create and distribute shares of the Master Secret to two Distributed Private Key Generators (D-PKG), initialize and route the inter-process communication between the nodes, co-ordinate and computationally participate in the User System's IBE Private Key generation process. What is important is the Master Key Server, even though participating in the distributed private key generation computation never needs to be available to any User System receiving a private key, and can even go "offline" halfway through the protocol, in effect, removing itself from the burden of being a D-PKG node. This is a desirable security property, further securing the Master Secret used in the private key generation process for exponent inversion types, as it does not need to be connected to any other system other than the two D-PKG nodes participating in the protocol, and then for only half the entire process of the protocol. Additionally, the system and method safeguards the possibility of collusion between the two D-PKG nodes, as no direct communication exists between the nodes, as it is routed through the Master Key Server. The D-PKG nodes are made publicly available over a network connection for the purpose of issuing shares of the Master Public and the User System's IBE Private Key.

2) Secures private keys issued by the Distributed Private Key Generator (D-PKG) nodes at the point of creation, so that other software processes under the same administration as the D-PKG nodes, human operators of the system, or malicious software agents are unable to access or escrow the issued private keys. The system and method secures the distribution of private key shares from the D-PKG nodes to the authenticated, intended private key holder (User System) over a communications channel using a system and method of symmetric encryption and symmetric encryption key encapsulation using an identity based encryption system based upon exponent inversion type. This is a desirable property as the private keys can be securely re-issued repeatedly, which removes the requirement for the User System to store private keys beyond a session state.

3) Where the User System requires secure storage and archival of the User System's IBE Private Keys, because the Master Secret is changing and private keys will be issued from a different Master Secret, the system and method makes available to the User System the option to securely archive and retrieve all their past and currently issued private keys, archived to and stored directly with the Target System, but encrypted in a manner that secures the User System's IBE Private Keys against a malicious Master Key Server or Distributed Private Key Generator nodes that may be under the same organisational control as the Target System. This is a desirable property, as it removes the burden of key escrow in the scenario where a User System wishes to decrypt data on the Target System with IBE private keys issued from an expired Master Secret.

The approaches described in this section could be pursued but are not necessarily approaches that have been previously conceived or pursued when taken together as a whole system and method. Therefore, unless other wise indicated herein, the approaches described in this section are not prior art to the claims in this application and are not admitted to be prior art by inclusion in this section.

The main components of the invention include an Authentication System that participates in an authenticated key agreement protocol with another computer, the User System, over a network. An authenticated key agreement protocol allows two or more communicating parties to establish a common cryptographically strong secret, known as a Session Key, via public communication channels (e.g., internet). Also included, a Master Key Server and Distributed Private Key Generator (D-PKG) nodes that create shares of identity based encryption private keys, encrypt them for secure distribution to the User System at the point of creation, and also distribute shares of the Master Public Key. Finally, the Target System, which is a computer storage apparatus that is connected to a network. The Target System may or may not be under the same organisational control as the Master Key Server and Distributed Private Key Generator (D-PKG) nodes. The User System computes these shares of the Split Master Public Key and User System's IBE Private Key Shares as they are received into whole, usable identity based encryption keys (Master Public Key and User System's IBE Private Key). Other components utilize an Integrity Check, which uses cryptographic techniques readily available in "off the shelf" computer hardware to detect tampering of the virtual machine or processor instructions in which the D-PKG nodes and Master Key Server are run.

The Authentication System is a computer process running on a computer or server, which allows the server and another computer, or server, which is the User System, to mutually authenticate each other and establish a secure communications channel over an insecure network. The basis of the secure communications channel is the exchange of a cryptographically strong secret as a by-product of successful mutual authentication between the User System and the Authentication System. This cryptographically strong secret is employed as a Session Key; The Session Key is an encryption key that enables the two parties to communicate securely and is used again by other components within the system and method. Specifically, the Session Key is encapsulated using an identity based encryption key encapsulation method, (again, using an exponent inversion type identity-based encryption system) and distributed directly to the Distributed Private-Key Generator (D-PKG) nodes to establish a secure channel between the D-PKG and the User System as part of a cryptographically authenticated request to generate shares of the User System's identity based encryption private key and Master Public Key. This occurs after the Authentication System successfully authenticates the User System. The D-PKG are registered and known to the Authentication System through a process invoked by the Master Key Server during its setup phase.

For avoidance of doubt, encapsulation in an identity based encryption system of the exponent inversion type is different than encapsulation using the class of encryption techniques designed to secure symmetric cryptographic key material for transmission using asymmetric (public-key) algorithms or other identity based encryption systems. Much prior art has been issued, in particular on the most well known of these techniques, the Sakai-Kasahara identity-based Key Encapsulation Mechanism (SK-KEM), which is now a part of the IEEE P1363.3 standard draft.

The User System is the beneficiary of a system that uses the invention. The User System is authenticated by the Authentication System, receives from the D-PKG nodes shares of its private keys (User System's IBE Private Key Shares), and stores encrypted data on the Target System, including an archive of expired User System's IBE Private Keys. The system and method provides assurance that the data that is being stored on the Target System is not accessible by other components, even though the Master Key Server, D-PKG nodes, Authentication System and Target System may potentially be run in unison by the same organisation or process, the data stored on disk or in memory by the secure information exchange system (Target System) cannot be decrypted by the Master Key Server's computer processes, by other software processes of the same system, human operators of the system, or malicious software agents.

The Target System is a computer storage apparatus made available over a network connection. This Target System can take various forms such a three-tiered web service on the internet where the storage mechanism is a relational database, and the data is made available through a web application and web server over the Internet or Local Area Network, to proprietary storage formats only made available over dedicated links. What is important is that the encrypted data stored on the Target System stores not only the encrypted data but also proprietary metadata generated by the system and methods to be stored along with the encrypted data. Included in the metadata are cryptographic primitives that enable decryption of the data when accessed by the User System with its own decrypted identity-based encryption private keys.

The Master Key Server is a computer process running on a computer or server that initiates the setup phase of the Distributed Private-Key Generators (D-PKG) nodes. The Master Key Server creates and distribute shares of the Master Secret to two Distributed Private Key Generators (D-PKG), initializes and routes the inter-process communication between the D-PKG nodes and itself, co-ordinates and computationally participates in the private key generation process. The Master Key Server acts as a dealer of the shares of the Master Secret using a method incorporating Shamir's secret-sharing technique to a pre-selected set of D-PKG nodes, and keeps one share for itself. The Master Key Server registers the D-PKG nodes with the Authentication System, manages these nodes, audits their use and provides a policy framework for their use.

Distributed Private-Key Generator (D-PKG) nodes are computer processes running on a computer or server. D-PKG nodes collaboratively offer private and Master Public Key distribution service nodes during network operation such that as long as there is no less than n such nodes being functional, shares of private keys and Master Public Keys can still be issued. The issuance of these shares from the D-PKG begins when it receives an authenticated request from the Authentication System after it has authenticated the identity of the User System.

The Integrity Check is established prior art and is a process that uses a hardware-based security foundation readily available on today's computer processors which are enabled specifically for protecting the internal code and cryptographic primitives of a virtual machine or processor instruction set, checking the integrity of this code prior to the boot up process. Hardware-based processes provide greater protection for information that is used and stored on a computer. A key aspect of that protection is the provision of an isolated execution environment and associated sections of memory where operations can be conducted on sensitive data, invisibly to the rest of the system. The Integrity Check takes advantage of a sealed portion of storage on the processor where sensitive data such as encryption keys are kept, helping to shield them from being compromised during an attack by malicious code. To make sure that code is, in fact, executing in this protected environment, attestation mechanisms verify that the system has correctly invoked the hardware-based processor's integrity checking mechanisms.

Detailed Description of the Authentication System

As per the illustration in FIG. 1, the Authentication System (10) can be software running on a computer, or a dedicated hardware device, that contains a processor (11) with the appropriate computer code running the instructions. The primary purpose of the Authentication System (10) is to authenticate a User System (20) as the first step in the system and method workflow, using an authenticated key agreement protocol that produces a cryptographically strong secret, the Session Key (13), as a by-product of successful mutual authentication between the User System (20) and the Authentication System (10). A Session Key (13) is generated by both the Authentication System (10) and the User System (20) independently during their communication session, without ever communicating the actual Session Key (13). There are many examples of prior art in the field of cryptography for these systems, including Secure Remote Password and others. What is required is that the cryptographic system authenticates the User System (20) to the Authentication System (10) using the Parameters (12) that are required for the cryptographic workflow of that particular system, and that the Session Key (13) is available to both parties at the conclusion of the cryptographic protocol upon successful mutual authentication. This authentication workflow happens over a communications link, for example, such as the Internet or Local Area Network. Upon successful authentication of the User System, the system and method establishes a communications link between the Authentication System (10) and Distributed Private-Key Generator (D-PKG) (60) nodes. The Authentication System sends the Session Key (13) that is established over a secured communications link to the Distributed Private-Key Generator (D-PKG) (60) nodes, for example, over the HTTPS communications protocol as part of the request to issue the User System's IBE Private Key Shares (28) to the User System (20). The Session Key (13) is used by the Distributed Private-Key Generator (60) nodes to encrypt User System's IBE Private Key Shares (28) at the point they are created, before the distribution of the shares to the User System (20).

Structural and Functional Variations of the Authentication System

The Authentication System (10) can use any variety of cryptographic systems that, as a result, will produce a Session Key (13) that is only known to the Authentication System (10) and the User System (20) as a result of successful authentication. Ideally, the cryptographic system employed would enable the widest possible applicability of use cases in a production setting, so that the Authentication System (10) could be accessed from web browsers to processors with specialized instruction sets. These production settings would vary from web browser to web server communications to mobile ad-hoc networks (MANETs) with the intention of securing wireless communications. Again, what is required is that a unique one-time Session Key (13) is created between the User System (20) and the Authentication System (10) for each intended and unique communication session between the Target System (40) and the User System (20) and when private keys are distributed from the Distributed Private-Key Generator (D-PKG) (60) nodes to the User System (20).

Detailed Description of the User System

As per the illustration in FIG. 1, the User System (20) can be a computer or server with software (21) that is readily available on most personal computer or smart device platforms, such as a web browser, or specialized software, such as a software client or server process, or hardware that is specifically purpose built with a processor (22) that enables the instructions for decryption, encryption, and digital signing, as well as secured storage (23). That storage may be solely in memory or on a device, such as a USB flash drive. The User System elects to be a beneficiary of this system and method and uses an Id (24) by which it can authenticate itself against with the Authentication System (10), and whereby Distributed Private-Key Generator (D-PKG) (60) nodes can issue the User System's IBE Private Key Shares (28) in an ASCII string representing the Id (24).

Structural and Functional Variations of the User System

In the preferred embodiment of the invention, the User System (20) will be enabled to securely archive and backup the User System's IBE Private Key (29) with the Target System (40) through a cryptographic workflow using a combination of asymmetric public private-key and symmetric key cryptography. The intention is to backup and archive the User System's IBE Private Keys (29) securely without exposing the keys in the clear to the Target System (40), which could be under the same organisational control as the Master Key Server (50). A User System (20) creates User System's Asymmetric Public and Private key pair (26) and (27) along with the User System's Symmetric Encryption Key (25), which itself can be generated from a pass phrase when used in conjunction with a password derivation protocol such as PBKDF2. Upon receiving the User System's IBE Private Key (29) to be used in the current time period, the User System (20) will employ the User System's Asymmetric Public Key (26) to encrypt the User System's IBE Private Key (29). Additionally, the User System (20) will encrypt the User System's Asymmetric Private Key (27) with the User System's Symmetric Encryption Key (25) derived from the pass phrase. All keys except the User System's Symmetric Encryption Key (25) derived from the pass phrase are archived with the Target System (40) through a programmatic back up or sync process that, for example, can occur over the HTTPS protocol. The benefits of the system and method are desirable because the Master Key Server (50) does not have to escrow (i.e., the key escrow issue) the Master Secret (53) beyond the current period of operation for the purpose of retrieving data that must be decrypted using the User System's IBE Private Keys (29) from a time period in the past where a different Master Secret (53), and therefore a different User System's IBE Private Key (29), was in use; see attached Appendix 1 for the software code regarding Master Secrete (53).

Upon receipt of an authenticated request by the User System (20) to the Target System (40) to make available all past User System's IBE Private Keys (29), and upon receipt of the encrypted keys, the operator of the User System (20) needs only to apply the User System's Symmetric Encryption Key (25) by, for example, entering a pass phrase into a software (21) dialogue on the User System (20) by which the User System's Symmetric Encryption Key (25) is re-constituted via a password derivation function, and the symmetric key is used to decrypt the User System's Asymmetric Private Key (27). The final step is to decrypt all archived User System's IBE Private Keys (29) that have been encrypted with the User System's Asymmetric Public Key (26).

This method is also the preferred embodiment for distributing User System's IBE Private Keys (29) in an offline scenario, whereby the User System (20) and the Distributed Key Generator (D-PKG) (60) nodes cannot have any degree of interaction or an interactive on-line session, but where the User System's Asymmetric Public Key is made available, for example, through the Authentication System Directory (14).

As an example, Distributed Key Generator (D-PKG) (60) nodes could distribute to the User System (20) the current time period's User System's IBE Private Key Shares (28) over a store and forward mechanism such as the SMTP protocol or in an online storage locker by generating the shares, encrypting the shares with the User System's Asymmetric Public Key (26), whereby they would be decrypted by the User System's Asymmetric Private Key (27) when the User System (20) accesses the shares.

Detailed Description of the Target System

As per the illustration in FIG. 1, the Target System (40) is a computer or server running software on a processor (41) or a dedicated hardware device with a processor (41) with a storage (44) medium which could be computer memory or other commonly known storage mediums such as tape drives, disk drives and flash drives. The Target System must be able to establish a network connection, such as a connection over the Internet, Local Area Network or PCI channel. It's primary purpose is to serve as the mechanism to store Encrypted Data (42) and its attendant Associated Metadata (43) in the case of archival or long term storage of data, for example, in the case of the utilisation of tape drives, or, in another embodiment, a three-tier web service architecture consisting of a database, an application server and a web server with connection via the Internet. In another embodiment, the Target System (40) may be a USB drive connected to a host computer or server. The requirement of the Target System (40) is that it must be able to be communicated to by the User System over a communications link, and that it has the storage (44) capacity to store the Encrypted Data (42) and Associated Metadata (43).

Detailed Description of the Master Key Server

As per the illustration in FIG. 1, the Master Key Server (50) is a computer or server running software (51) on a processor (52) or a dedicated hardware device with a processor (52). The Master Key Server (50) enables the creation and distribution of Master Secret (53) to the Distributed Private-Key Generator (D-PKG) (60) nodes. What is important to note is that the Distributed Private-Key Generator (D-PKG) (60) nodes themselves receive their own, whole, IBE Private Keys (65) of the exponent inversion type issued from the Master Key Server (50). This occurs during the start-up and node initialisation phase directed by the Master Key Server (50). Additionally, the Master Key Server (50) makes available to the Authentication System via access to the Master Key Server (40) the Split Master Public Keys (64) for the purpose of distributing encapsulated Session Keys (13). The primary functions of the Master Key Server (50) are to set-up the nodes of the Distributed Private-Key Generator (D-PKG) (60) nodes with the right cryptographic primitives, establish secure communications with the Authentication System (10), permit usage of the nodes through a policy framework and audit the usage of the nodes.

Detailed Description of the Distributed Private-Key Generator

As per the illustration in FIG. 1, the Distributed Private-Key Generator (D-PKG) (60) nodes are computers or servers running software (61) on a processor (62) or a dedicated hardware device with a processor (62). In the preferred embodiment of the invention, the system makes use of the t-out-of-n secret sharing scheme of Shamir secret sharing and a multi-party computation protocol. During the set-up process, the Master Key Server (50) facilitates the initial connections between the Distributed Private-Key Generator (D-PKG) (60) nodes; the set-up process runs between the three servers and results in each server obtaining a share x(i) of the master secret x; the Split Master Secret (63). The Master Key Server (50) also facilitates the secure registration of the Distributed Private-Key Generator (D-PKG) (60) nodes to the Authentication System's Directory (14) after the initial set-up. This directory serves to tie the User Systems (20) to the right Distributed Private-Key Generator (D-PKG) (60) nodes in order to receive the User System's IBE Private Key Shares (28).

The benefits of this system and method are desirable; the Authentication System (10) infrastructure is leveraged by the Master Key Server (50) and Distributed Private-Key Generator (D-PKG) (60) nodes to securely distribute the User System's IBE Private Key Shares (28) over insecure networks and connections. For example, the User System's IBE Private Key (29) is re-assembled from encrypted User System's IBE Private Key Shares (28) received from the Distributed Private-Key Generator (D-PKG) (60) nodes as the User System (20) receives the shares. The encryption key used to encrypt the Private Key Shares (64) is the actual Session Key (13) that remains in state on the User System (20) as a result of the successful authentication between it and the Authentication System (10). The Session Key (13) is securely transmitted to the Distributed Private-Key Generator (D-PKG) (60) nodes by the Authentication System (10) post successful authentication of the User System (20) for the purpose of encrypting the User System's IBE Private Key Shares (28) to securely distribute to the User System (20).

This is accomplished by using the exponent inversion type identity based encryption system. Specifically, during the set-up phase of the Distributed Private-Key Generator (D-PKG) (60) nodes, each node receives a whole IBE Private Key as if it was a user rightfully requesting a private key from the organisation running the Master Key Server (50), derived from the Master Secret (53) in current operation; this is the D-PKG IBE Private Key (65). The Distributed Private-Key Generator (D-PKG) (60) nodes receive the whole D-PKG IBE Private Key (65) issued in the ASCII string of the node's network addresses (e.g., IP addresses or URLs) (67) from the Master Key Server (50) during the set-up phase. The Split Master Public Key (64) is assembled into a whole Master Public Key (15) by the Authentication System (10) and recorded into the Authentication System Directory (14) upon initial registration of the nodes during the set-up phase. The Authentication System (10) uses the Master Public Key (15) and the network addresses (e.g., IP addresses or URLs) (67) of the node as programmatic input to encapsulate the Session Key (13) through an identity based encryption of the exponent inversion type. Upon receipt of the encapsulated Session Key (13), the Distributed Private-Key Generator (D-PKG) (60) nodes de-encapsulate the Session Key (13), and use the Session Key (13) to encrypt the User System's IBE Private Key Shares (28) for distribution to the User System (20) in an interactive session. The User System (20) decrypts the User System's IBE Private Key Shares (28) using the Session Key (13), and re-assembles the shares into the whole User System's IBE Private Key (29).

Detailed Description of the Integrity Check

As per the illustration in FIG. 1, consider that the Distributed Private-Key Generator (D-PKG) (60) nodes do not hold that state or store any other property except for the Split Master Secret (63) and their IBE Private Key (65), and they hold the Split Master Secret (63) and IBE Private Key (65) inside of the Sealed Storage (32), part of the Integrity Check (30) system. As an example, the Distributed Private-Key Generator (D-PKG) (60) nodes would use the Isolated Execution Environment (34) to run the Distributed Private-Key Generator (D-PKG) (60) processes and the Sealed Storage (32) to store the Split Master Secret (63) and IBE Private Key (65), where operations can be conducted on sensitive data, invisibly to the rest of the system. Further, the Attestation Mechanisms (33) of the Integrity Check (30) would be invoked upon the boot up or re-boot of the virtual machine or processor code running the Distributed Private-Key Generator (D-PKG) (60). This would alert the operator of the Distributed Private-Key Generator (D-PKG) (60) to any potential malicious software or hardware attacks that have modified the state or code of the virtual machine or processor code, cryptographically protecting the integrity of the virtual machine or processor code. Finally, once the virtual machine or processor code has been deployed and has created and has stored the Split Master Secret (63) and IBE Private Key (65) inside of the Sealed Storage (32), all access to the process is disabled forever. This is accomplished through the use of an Access Control Program (66) compiled to run on the Processor (31), which disables access for all accounts, performs the attestation checks at boot up or re-boot, stores the Split Master Secret (63) and IBE Private Key (65) inside of the Sealed Storage (32) and auto-runs the Distributed Private-Key Generator (D-PKG) (60) processes upon boot-up or reboot.

Overview of Operation

Figure 2:
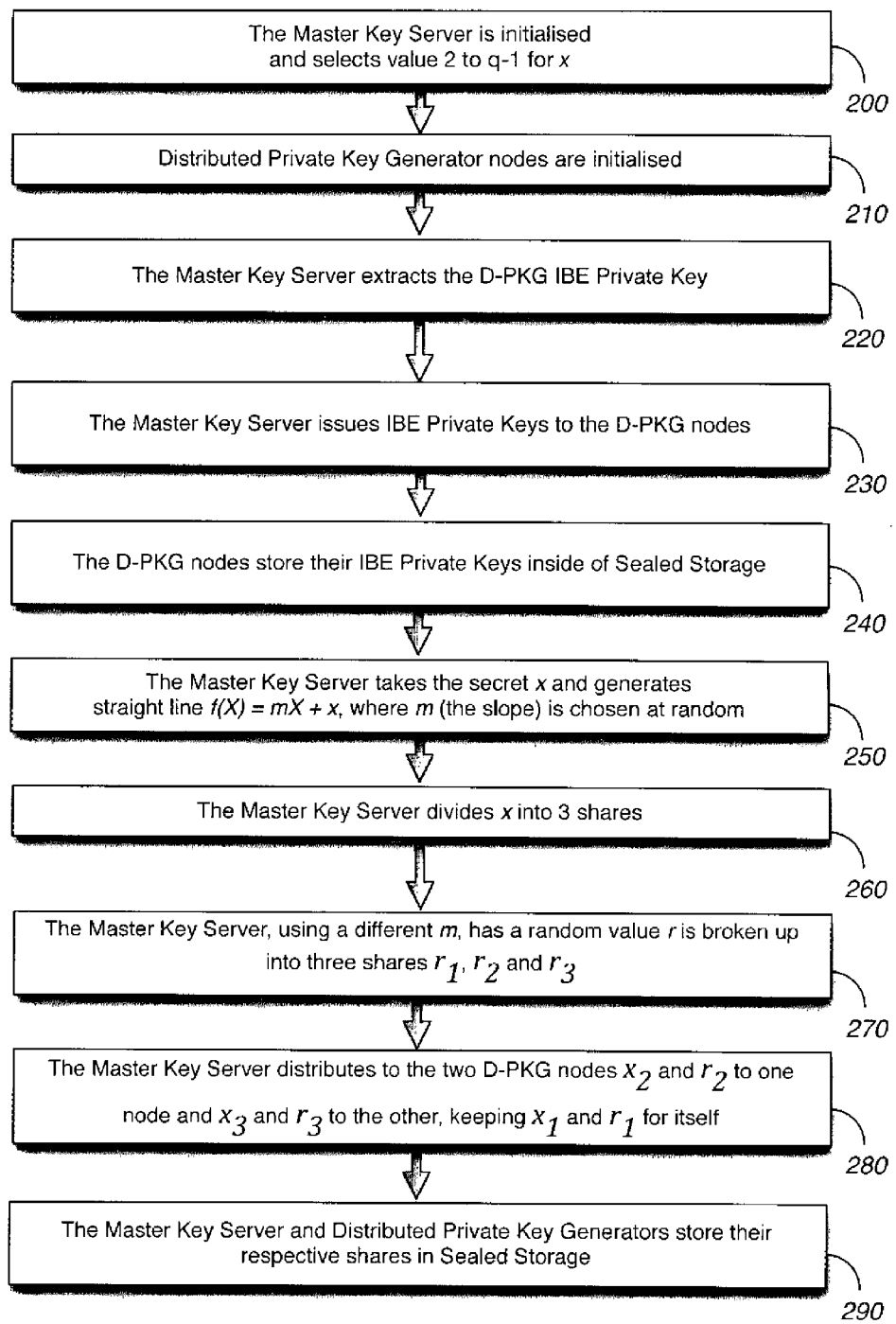
FIG. 2 is a block diagram that illustrates the steps taken that securely initializes the set-up phase of the Master Key Server and Distributed Private Key Generator nodes according to an embodiment of the invention.

In the exponent inversion type identity based encryption system according to the embodiment of the invention, the following systems and methods are employed together according to the diagram in FIG. 2. The Master Key Server is initialised and is programmatically configured to employ a Sakai-Kasahara IBE of the type-3 pairing $P_T = e(P_1, P_2)$ is $G_1 \times G_2 \rightarrow G_T$, where $P_1 \in G_1$, $P_2 \in G_2$, and $P_T \in G_T$. All elements of each of these three groups are of order q. In Sakai-Kasahara IBE, a single instance Private Key Generation server is represented as $S = 1/(x+ID).P_2$, where $P_2$ is a fixed public point and ID is the hashed identity of the client. The Master Secret is represented as x and this will be distributed between the two Distributed Key Generator nodes and the Master Key Server. Additionally, there is also a requirement to provide to the Authentication Service the Master Public Key $R = xP_1$. The Master Key Server is initialised and randomly selects a value 200 in the range of 2 to q-1 for x. Distributed Private Key Generator nodes are initialised 210 and is made available to the Master Key Server over a secured communications channel; a secret key issued in an out of band channel from the Authentication System to the Master Key Server is sent through the secured communications channel to the Distributed Private Key Generator nodes as part of the initialisation, as well as indicating which node is the primary node. The Master Key Server extracts the D-PKG IBE Private Key 220 from x by using the D-PKG Id (e.g., IP addresses or URLs) and the Master Secret using the SK-KEM methodology. The Master Key Server issues 230 the D-PKG IBE Private Key to the Distributed Private Key Generator nodes over the secured communications channel. The Distributed Private Key Generator nodes store their D-PKG IBE Private Key 240 inside of Sealed Storage. The Master Key Server Take the secret x and generates an equation 250 of a straight line f(X)=mX+x, where m (the slope) is chosen at random. The Master Key Server divides x into 3 shares x.sub.1, x.sub.2 and x.sub.3, 260 from which x can be reconstructed using Lagrangian interpolation and the Master Key Server removes x from its memory. The Master Key Server, using a different m, has a random value r is broken up into three shares r.sub.1, r.sub.2 and r.sub.3 270 to be used later in the calculation of the Master Public Key shares. The Master Key Server distributes over a secure communications channel 280 to the two Distributed Private Key Generator nodes x.sub.2 and r.sub.2 to one node and x.sub.3 and r.sub.3 to the other, keeping x.sub.1 and r.sub.1 for itself. The Master Key Server and Distributed Private Key Generators store their respective shares in Sealed Storage 290.

Figure 3:
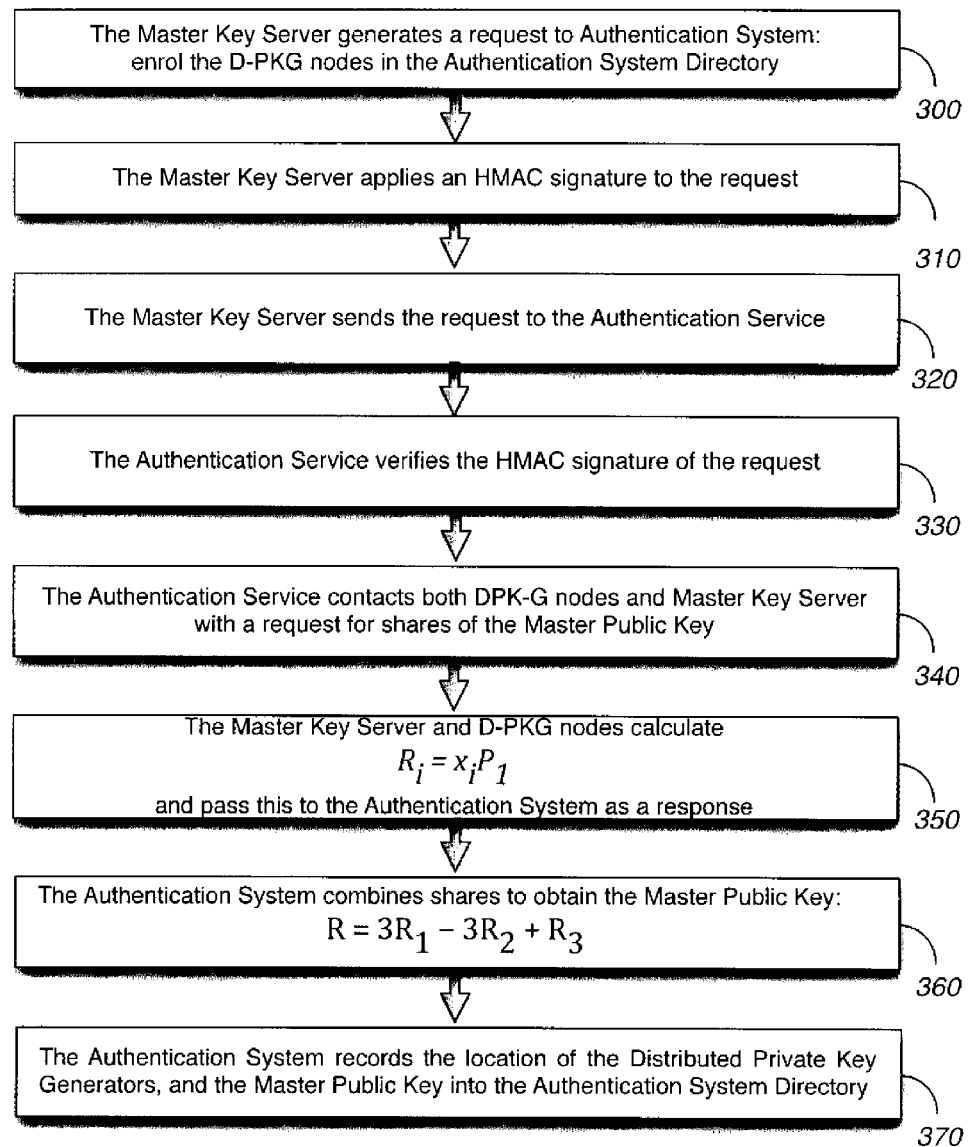
FIG. 3 is a block diagram that illustrates the steps taken that securely registers the Distributed Private Key Generator nodes with the Authentication System using the Master Key Server according to an embodiment of the invention.

In the exponent inversion type identity based encryption system according to the embodiment of the invention, the following systems and methods are employed together according to the diagram in FIG. 3. The Master Key Server programmatically generates a request 300 to the Authentication System to enrol the Distributed Private Key Generator nodes in the Authentication System Directory that contains the network addresses (e.g., IP addresses or URLs) of the Distributed Private Key Generator nodes. The Master Key Server programmatically applies an HMAC (Hash-based Message Authentication Code) signature 310 using the secret key issued from the Authentication Service to the Master Key Server in an out of band method to verify the data integrity and authenticity of the message. The Master Key Server sends to the Authentication Service the request 320 over a secure communications channel. The Authentication Service verifies the HMAC signature 330 using the secret key it has issued to the Master Key Server. Assuming the HMAC signature verifies, the Authentication Service establishes a secure communications channel with the Distributed Private Key Generator nodes for the purpose of collecting shares of the Master Public Key from that instance of D-PKG nodes and Master Key Server. The Authentication Service contacts each Distributed Private Key Generator node and the Master Key Server 340 with a request containing an HMAC signature to receive shares of the Master Public Key using the same secret key used by the Master Key Server in the step preceding. Assuming the HMAC signature verifies in the request, each node and the Master Key Server individually calculate R.sub.i=x.sub.iP.sub.1 and pass this to the Authentication System as a response 350, again each response containing an HMAC signature of the response calculated the secret key. Assuming each response containing the HMAC signature verifies, the Authentication System 360 combines these shares to obtain the Master Public Key R=3R.sub.1-3R.sub.2+R.sub.3. The Authentication System records the location of the Distributed Private Key Generators, and the Master Public Key into the Authentication System Directory 370.

Figure 4:
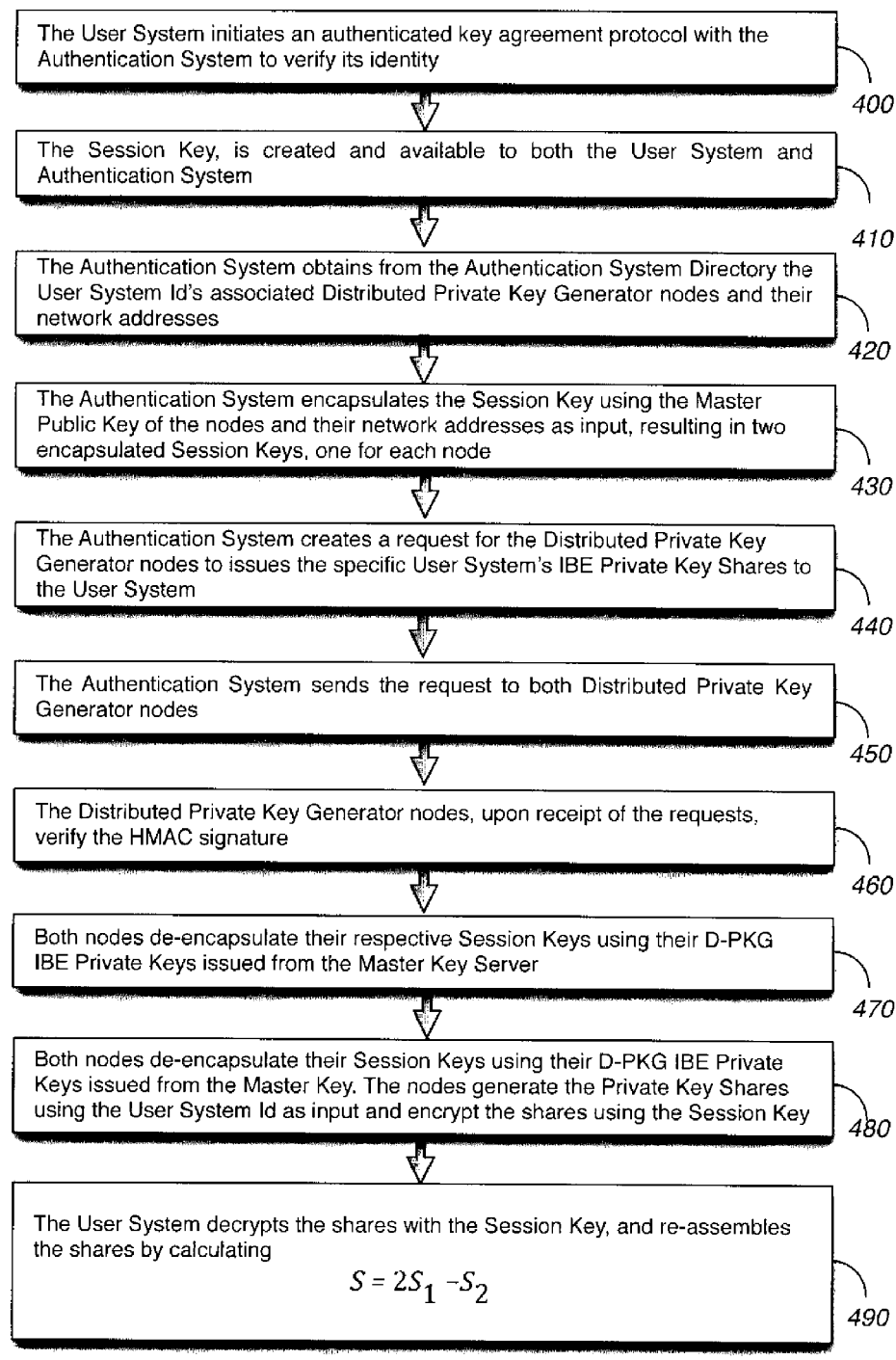
FIG. 4 is a block diagram that illustrates the steps taken to send an authenticated request from the Authentication System to the Distributed Private Key Generator nodes to issue the User System's IBE Private Key Shares to the User System according to an embodiment of the invention.

In the exponent inversion type identity based encryption system according to the embodiment of the invention, the following systems and methods are employed together according to the diagram in FIG. 4. The User System initiates an authenticated key agreement protocol with the Authentication System 400 to verify its identity for the purpose of getting access to its private keys and the Target System. Upon successful authentication, a cryptographic common secret, the Session Key, is created and available 410 to both the User System and Authentication System. Using the User System Id as the lookup value, the Authentication System obtains from the Authentication System Directory 420 the User System Id's associated Distributed Private Key Generator nodes and their network addresses (e.g., IP addresses or URLs), the corresponding secret key for HMAC and the Master Public Key. The Authentication System encapsulates the Session Key using the Master Public Key of the nodes and their network addresses as input, 430 resulting in two encapsulated Session Keys, one for each node. The Authentication System creates a request for the Distributed Private Key Generator nodes to issues the specific User System's IBE Private Key Shares to the User System 440. In an online HTTP interactive session, this request could be in the form of an AJAX request, for example. The request contains the encapsulated Session Keys, the User System Id, and an HMAC signature of the request. The Authentication System sends the request to both Distributed Private Key Generator nodes 450. The Distributed Private Key Generator nodes, upon receipt of the requests 460, verify the HMAC signature. Assuming the signature verifies, both nodes de-encapsulate their respective Session Keys 470 using their D-PKG IBE Private Keys issued from the Master Key Server. The nodes generate the User System's Private Key Shares using the User System Id as input 480 and encrypt the shares using the Session Key and return a response to the User System that contains the encrypted shares. The User System decrypts the shares it receives with the Session Key it has held in state, and re-assembles the shares by calculating S=2S$_1$–S$_2$490 as the User System only needs to receive shares from two nodes, when a typical three share solution in an IBE of the exponent inversion type would require S=3S$_1$–3S$_2$+S$_3$. Note that the inter-process communication between the nodes and the Master Key Server during this process is detailed in the following section.

Figure 5:
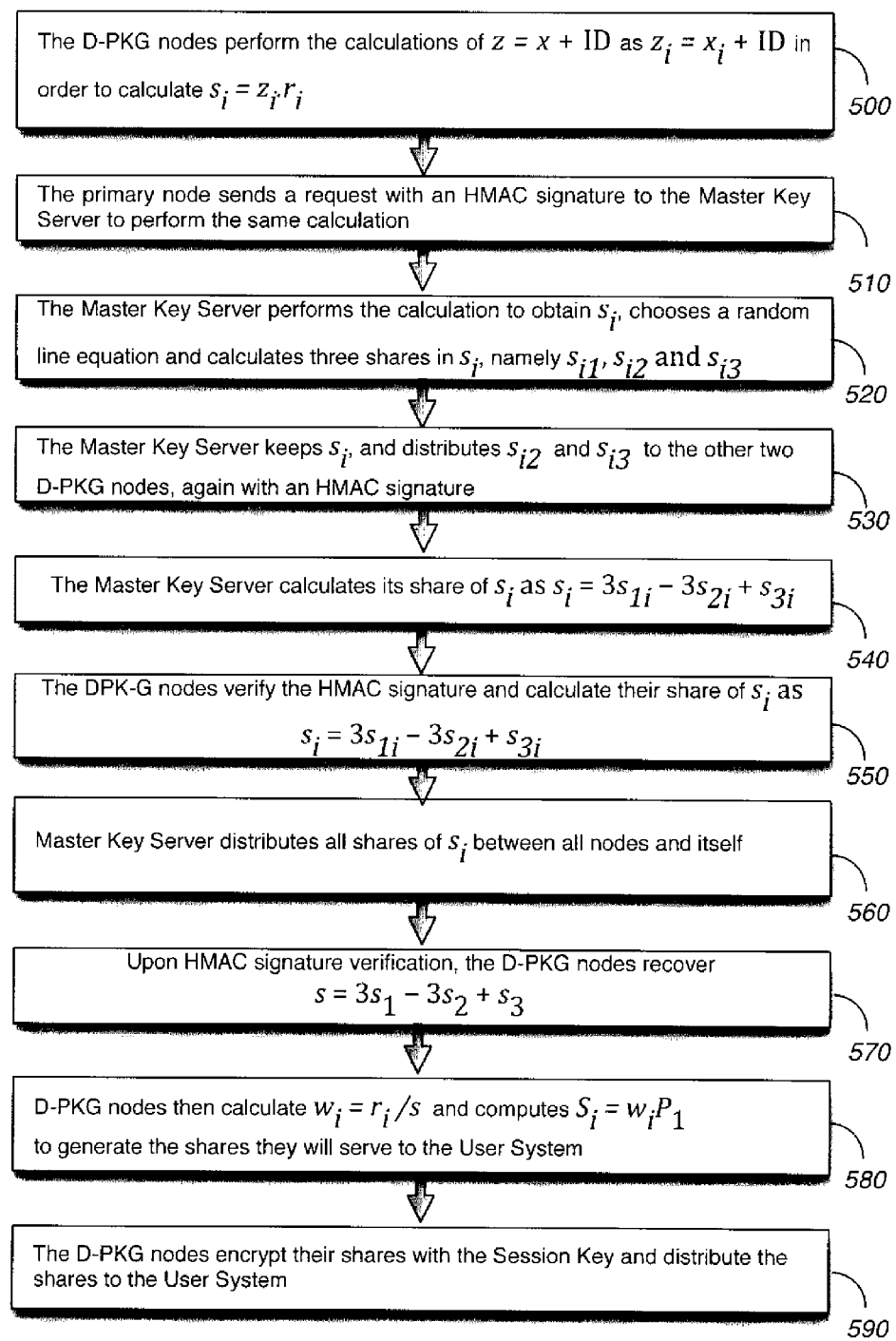
FIG. 5 is a block diagram that illustrates the steps taken an for secure inter-process communications between the Master Key Server and the Distributed Private Key Generator nodes according to an embodiment of the invention.

In the exponent inversion type identity based encryption system according to the embodiment of the invention, the following systems and methods are employed together according to the diagram in FIG. 5. When the requests from the Authentication Service to Distributed Private Key Generator nodes are received, the nodes check the validity of the HMAC signature using the secret key. Assuming the signature is valid, the primary node begins its role as co-ordinating communications to and from the Master Key Server on behalf of the Authentication Service and User System. The Master Key Server only need be available to the other two nodes for half of the protocol, and never available to the User System or Authentication System directly, hence the requirement for the primary node to initially direct the communications. However, the Master Key Server provides for communication routing between the nodes in order to lower the risk of D-PKG node collusion for the purpose of re-assembling the Master Secret should the nodes be compromised, so the D-PKG nodes never communicate directly with each other, only through the Master Key Server. Each communication between Master Key Server and the nodes contains an HMAC signature of the communication using the secret key that was distributed to the nodes during the set-up and initialisation phase. The D-PKG nodes receive the request from the Authentication Service, verify the HMAC signature and 500 perform the calculations of z=x+ID as $z_i$=$x_i$+ID in order to calculate $s_i$=$z_i$,$r_i$ where i is the node. In an asynchronous operation, the primary node sends a request with an HMAC signature over a secure communications channel to the Master Key Server to perform the same calculation 510. Upon receipt of this request and verification of the HMAC signature, the Master Key Server performs the calculation to obtain $S_i$, chooses a random line equation and calculates three shares in $s_i$, 520 namely $s_{i1}$, $s_{i2}$ and $s_{i3}$. The Master Key Server keeps $s_{i1}$, and in an asynchronous operation distributes $s_{i2}$ and $s_{i3}$ 530 to the other two D-PKG nodes, again with an HMAC signature. The Master Key Server 540 calculates its share of $s_i$ as $s_i=3s_{1i}-3s_{2i}+s_{3i}$. The DPK-G nodes verify the HMAC signature 550 and also calculate their share of $s_i$ as $s_i=3s_{1i}-3s_{2i}+s_{3i}$. In an asynchronous operation, the D-PKG nodes message their shares of $s_i$ to the Master Key Server that messages its share of $s_i$ and the received shares of $s_i$ from one node to the opposite node 560, again, with HMAC signatures. Upon HMAC signature verification, the D-PKG nodes 570 recover $s=3s_1-3s_2+s_3$. The D-PKG nodes then calculate 580 $w_i=r_i/s$ and computes $S_i=w_iP_1$ to generate the shares they will serve to the User System. The D-PKG nodes encrypt their shares with the Session Key (as described in 480) and distribute the shares to the User System 590.

In the exponent inversion type identity based encryption system according to the embodiment of the invention, the following systems and methods are employed together according to the diagram in FIG. 6. The User System is in possession of its User System's IBE Private Keys and wishes to archive them on the Target System. In the preferred embodiment of the invention, the User System is authenticated to the Target System through the Authentication System and is provided access 600 to the Target System. The User System programmatically creates the User System's Asymmetric public/private key pair using the ECDSA algorithm 610. The User System prompts the human operator to create the User System's Symmetric Encryption Key by prompting the human operator for a pass phrase 620 where the User System takes the input and calculates the Symmetric Encryption Key using a derivation protocol such as PBKDF2.sup.8. The User System employs the User System's Asymmetric Public Key to encrypt the User System's IBE Private Keys 630. The User System encrypts the User System's Asymmetric Private Key with the User System's Symmetric Encryption Key 640 derived from the pass phrase. The User System programmatically uploads to the Target System 650 all keys except the User System's Symmetric Encryption Key derived from the pass phrase via a process that, for example, can occur over the HTTPS protocol. The User System's Symmetric Encryption Key derived from the pass phrase is securely removed 660 from the User System's memory. Additionally, the Target System can make available to the Authentication System the User System's Asymmetric Public Key over a communication channel 670. The Authentication System receives the User System's Asymmetric Public Key, and writes the key into an associate record corresponding to the User System's Id in the Authentication System Directory 680. Where the D-PKG nodes issue another User System's IBE Private Key because the Master Key has been expired, revoked or rotated, the User System can programmatically add to the archive upon the receipt of a new IBE Private Key.

Figure 7:
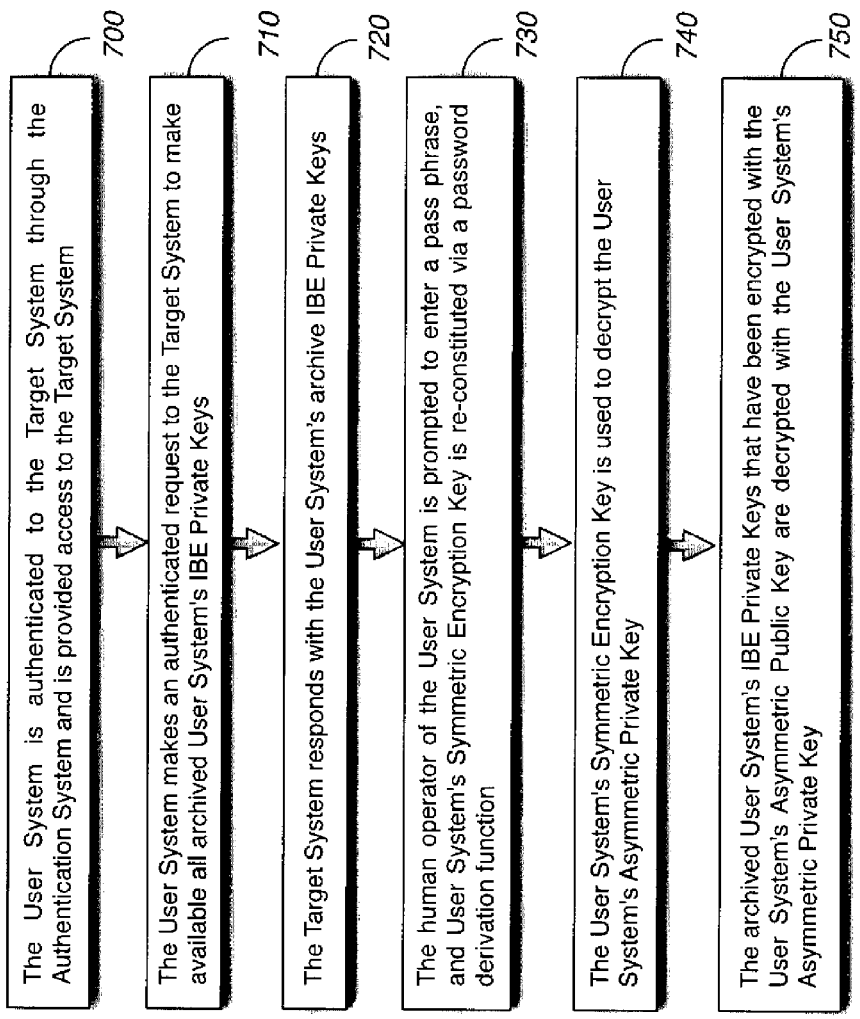
FIG. 7 is a block diagram that illustrates the steps taken by the User System to decrypt an archive of its IBE Private Keys according to an embodiment of the invention.

In the exponent inversion type identity based encryption system according to the embodiment of the invention, the following systems and methods are employed together according to the diagram in FIG. 7.

In the preferred embodiment of the invention, the User System is authenticated to the Target System through the Authentication System and is provided access 700 to the Target System. The User System makes an authenticated request to the Target System to make available all archived 710 User System's IBE Private Keys. This could occur over HTTPS communication channel, for example. The Target System responds with the 720 User System's archive IBE Private Keys. The human operator of the User System is prompted to enter a pass phrase, and User System's Symmetric Encryption Key 730 is re-constituted via a password derivation function. The User System's Symmetric Encryption Key is used to decrypt 740 the User System's Asymmetric Private Key. The archived User System's IBE Private Keys that have been encrypted with the User System's Asymmetric Public Key are decrypted 750 with the User System's Asymmetric Private Key.

Figure 8:
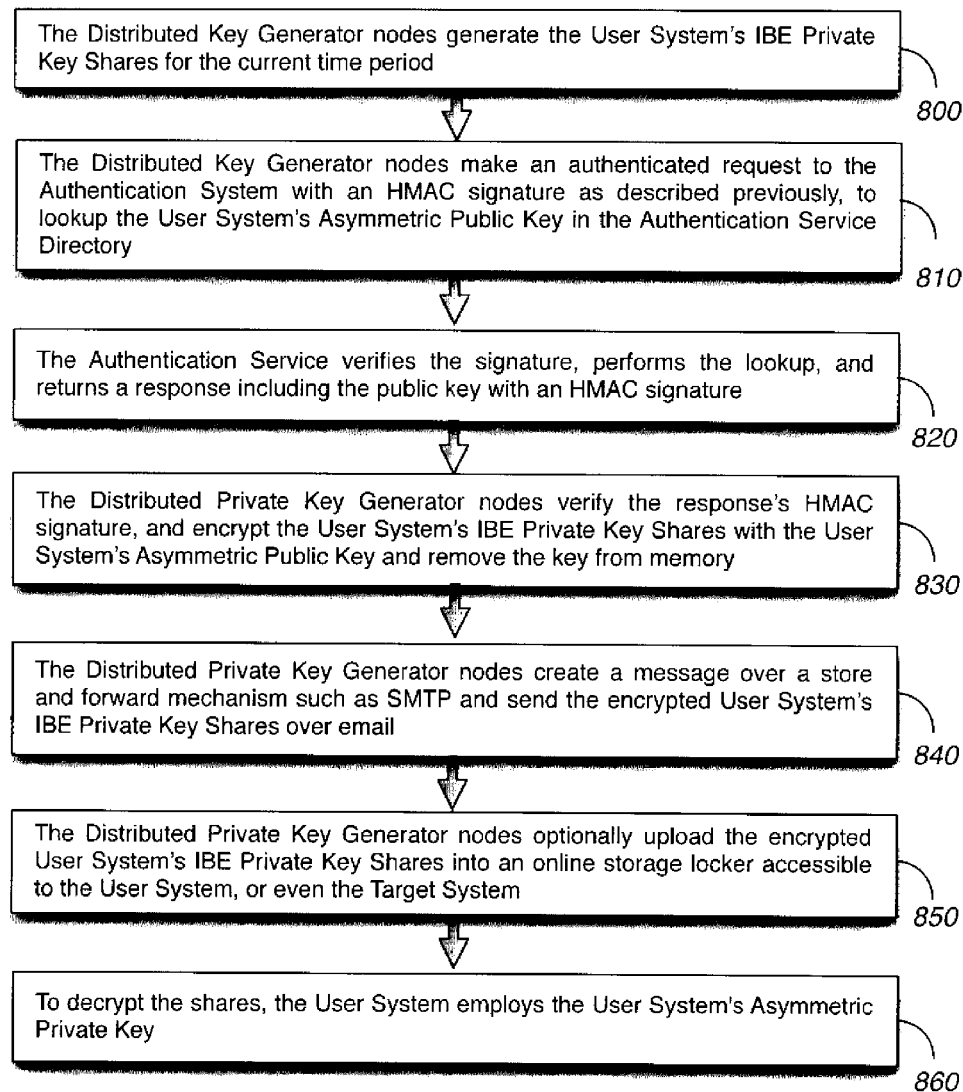
FIG. 8 is a block diagram that illustrates the steps taken by the Distributed Private Key Generator nodes to distribute User System's IBE Private Key Shares by way of a non-interactive communication using the User System's publicly available User System's Asymmetric Public Key according to an embodiment of the invention.

In the exponent inversion type identity based encryption system according to the embodiment of the invention, the following systems and methods are employed together according to the diagram in FIG. 8. In the preferred embodiment for distributing User System's IBE Private Keys in an offline scenario, whereby the User System and the Distributed Key Generator nodes cannot have any degree of interaction or an interactive on-line session, but where the User System's Asymmetric Public Key is made available through the Authentication System Directory, the following occurs. The Distributed Key Generator nodes generate the User System's IBE Private Key Shares for the current time period 800. The Distributed Key Generator nodes make an authenticated request to the Authentication System with an HMAC signature as described previously, to lookup the User System's Asymmetric Public Key in the Authentication Service Directory 810. The Authentication Service verifies the signature, performs the lookup, and returns a response including the public key 820 with an HMAC signature. The Distributed Private Key Generator nodes verify the response's HMAC signature, and encrypt the User System's IBE Private Key Shares with the User System's Asymmetric Public Key 830 and remove the key from memory. In one embodiment of the invention, the Distributed Private Key Generator nodes create a message over a store and forward mechanism such as SMTP and send the encrypted User System's IBE Private Key Shares over email 840. In another embodiment of the invention, the Distributed Private Key Generator nodes upload the encrypted User System's IBE Private Key Shares into an online storage locker 850 accessible to the User System, or even the Target System. To decrypt the shares, the User System employs the User System's Asymmetric Private Key 860.

The invention claimed is:

1. A method comprising:
selecting a value for x of 2 to q-1;
extracting, at a Master Key Server, identity-based encryption (IBE) Private Keys for two distributed private key generator (D-PKG) nodes;
issuing the IBE Private Keys to the D-PKG nodes;
storing the IBE Private Keys at the D-PKG nodes;
generating a straight line f(X)=mX+x, where m (the slope) is chosen at random;
dividing x into 3 shares, $x_1$, $x_2$ and $x_3$;
using a different m, breaking a random value r into three shares, $r_1$, $r_2$ and $r_3$;
distributing by the Master Key Server to the two D-PKG nodes $x_2$ and $r_2$ to one D-PKG node and $x_3$ and $r_3$ to another D-PKG node, keeping $x_1$ and $r_1$ for itself;
generating at the Master Key server a request to an Authentication System to enroll the D-PKG nodes in an Authentication System Directory;
applying at the Master Key Server hash-based message authentication code (HMAC) signature to the request;
sending by the Master Key Server the request to the Authentication System;
verifying at the Authentication System the HMAC signature of the request;
contacting by the Authentication System both D-PKG nodes and the Master Key Server with a request for shares of the Master Public Key;
calculating the Master Key server and D-PKG nodes respective shares $R_i=x_iP_1$ and passing this to the Authentication System as a response, where the Master Key server and D-PKG nodes are configured to support identity-based encryption based on a pairing operating on elements drawn from groups, where q is the order of elements of the groups and $P_1$ is an element of a first group of the groups;

combining at the Authentication System the shares $R_1$ $R_2$ and $R_3$ passed to the Authentication System, to obtain the Master Public Key:

$R=3R_1-3R_2+R_3$; and recording at the Authentication System the location of the Distributed Private Key Generators, and the Master Public Key into the Authentication System Directory.

2. The method of claim 1, further comprising:
initiating at a User System an authenticated key agreement protocol with the Authentication System to verify its identity;
creating a session key available to both the User System and Authentication System;
obtaining from the Authentication System Directory the User System Id's associated D-PKG nodes and their network addresses;
encapsulating at the Authentication System the Session Key using the Master Public Key of the nodes and their network addresses as input, resulting in two encapsulated Session Keys, one for each node;
creating at the Authentication System a request for the D-PKG nodes to issues the specific User System's IBE Private Key Shares to the User System;
sending by the Authentication System the request to both D-PKG nodes;
upon receipt of the requests, verifying at the D-PKG nodes the HMAC signature;
de-encapsulating their respective Session Keys using their D-PKG IBE Private Keys issued from the Master Key Server;
generating the Private Key Shares using the User System Id as input and encrypt the shares using the Session Key;
decrypting at the User System the shares with the Session Key, and re-assembling the shares by calculating $S=2S_1-S_2$ where $S_1$ and $S_2$ are decrypted shares.

3. The method of claim 2, further comprising: performing the calculations of $z=x+ID$ as $z=x+ID$, where ID corresponds to an identity associated with the User System, in order to calculate $s=z_i r_i$
sending a request with an HMAC signature to the Master Key Server to perform the same calculation;
performing at the Master Key Server the calculation to obtain $s_i$, choosing a random line equation and calculating three shares in $s_i$, namely $s_{i1} s_{i2}$ and $s_{i3}$;
keeping $s_{i1}$ at the Master Key Server, and distributing $s_{i2}$ and $s_{i3}$ to the other two D-PKG nodes, again with an HMAC signature;
calculating at the Master Key Server its share of $_{s1}$ as $s_i=3s_{1i}-3s_{2i}+s_{3i}$;
verifying at the D-PKG nodes the HMAC signature and calculating their share of Si as $s_i=3s_{1i}-s_{2i}+s_{3i}$;
distributing all shares $s_i$ between all nodes and the Master Key Server and upon HMAC signature verification recovering $s=3s_1-3s_2+s_3$ at the D-PKG nodes;
calculating at the D-PKG nodes $w_i=r_i/s$ and computing at the D-PKG nodes $S_{i=wi}P_1$ to generate shares to be served to the User System;
encrypting the shares with the Session Key at the D-PKG nodes and distributing the shares to the User System.

4. The method of claim 3, further comprising:
authenticating the user system to a Target System through the Authentication System and providing the user system with access to the Target System;
programmatically creating at the User System the User System's Asymmetric public/private key pair;
creating the User System's Symmetric Encryption Key by prompting for a pass phrase where the User System takes the input and calculating the Symmetric Encryption Key using a derivation protocol such as PBKDF2;
employing at the User System the User System's Asymmetric Public Key to encrypt the User System's IBE Private Keys;
encrypting at the User System the User System's Asymmetric Private Key with the User System's Symmetric Encryption Key derived from the pass phrase;
programmatically uploading by the User System to the Target System all keys except the User System's Symmetric Encryption Key derived from the pass phrase;
securely removing the User System's Symmetric Encryption Key derived from the pass phrase from the User System's memory;
making available by the Target System to the Authentication System the User System's Asymmetric Public Key over a communication channel;
receiving the User System's Asymmetric Public Key at the Authentication System, and writing the key into an associate record corresponding to the User System's Id in the Authentication System Directory.

5. The method of claim 4, further comprising:
making an authenticated request by the User System to the Target System to make available all archived User System's IBE Private Keys;
responding by the Target System with the User System's archive IBE Private Keys;
prompting, at the User System, to enter a pass phrase;
re-constituting the User System's Symmetric Encryption Key via a password derivation function;
using the User System's Symmetric Encryption Key to decrypt the User System's Asymmetric Private Key;
decrypting the archived User System's IBE Private Keys that have been encrypted with the User System's Asymmetric Public Key with the User System's Asymmetric Private Key.

6. The method of claim 5, further comprising:
generating at the D-PKG nodes the User System's IBE Private Key Shares for the current time period;
making an authenticated request by the D-PKG nodes to the Authentication System with an HMAC signature to lookup the User System's Asymmetric Public Key in the Authentication System Directory;
verifying the signature, performing the lookup, and returning a response including the public key with an HMAC signature at the Authentication System;
verifying the response's HMAC signature at the D-PKG nodes, and encrypting the User System's IBE Private Key Shares with the User System's Asymmetric Public Key and removing the key from memory at the D-PKG nodes;
creating a message over a store and forward mechanism such as SMTP at the D-PKG nodes and sending the encrypted User System's IBE Private Key Shares over email.

7. The method of claim 6, further comprising:
optionally uploading by the D-PKG nodes the encrypted User System's IBE Private Key Shares into an online storage locker accessible to the User System, or even the Target System;
employing the User System's Asymmetric Private Key at the User System to decrypt the shares.

* * * * *